United States Patent [19]

Land

[11] 3,907,563

[45] Sept. 23, 1975

[54] DIFFUSION TRANSFER PROCESS USING PROCESSING COMPOSITION IMPREGNATED IMAGE-RECEIVING ELEMENT

[75] Inventor: Edwin H. Land, Cambridge, Mass.

[73] Assignee: Polaroid Corporation, Cambridge, Mass.

[22] Filed: Dec. 13, 1973

[21] Appl. No.: 424,213

[52] U.S. Cl. ........................ 96/3; 96/29 D; 96/29 R; 96/76 R; 96/77; 96/78; 96/200

[51] Int. Cl.² .. G03C 7/00; G03C 5/54; G03C 1/40; G03C 3/02

[58] Field of Search ...... 96/3, 29 D, 77, 29 R, 76 R, 96/78, 200; 354/301, 302, 303, 305

[56] References Cited

UNITED STATES PATENTS

| | | | |
|---|---|---|---|
| 3,179,517 | 4/1965 | Tregillus et al. | 96/76 R |
| 3,345,165 | 10/1967 | Land | 96/3 |
| 3,415,645 | 12/1968 | Land | 96/29 D |
| 3,647,435 | 3/1972 | Land | 96/29 D |
| 3,661,585 | 5/1972 | Buckler | 96/29 D |
| 3,778,271 | 12/1973 | Land | 96/77 |
| T881,010 | 12/1970 | Cole | 96/29 R |

*Primary Examiner*—Norman G. Torchin
*Assistant Examiner*—Richard L. Schilling
*Attorney, Agent, or Firm*—Stanley H. Mervis

[57] ABSTRACT

Integral negative-positive reflection prints are obtained by a diffusion transfer process wherein the image-receiving element is impregnated with a processing liquid. The image-receiving element comprises a transparent support, an image-receiving layer, a light-reflecting layer and an opaque layer.

9 Claims, 2 Drawing Figures

Figure 1:
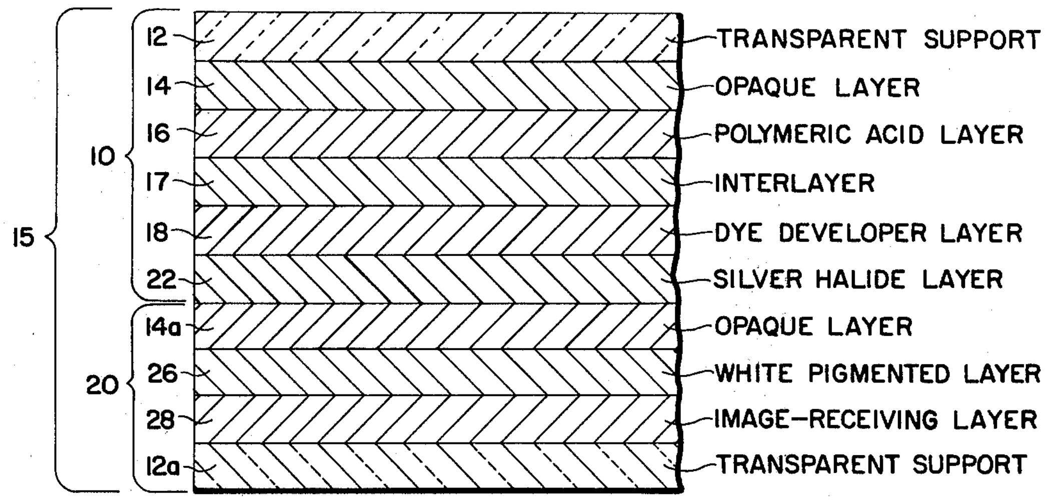

DIFFUSION TRANSFER PROCESS USING PROCESSING COMPOSITION IMPREGNATED IMAGE-RECEIVING ELEMENT

This invention is concerned with photography and, more particularly, with novel diffusion transfer processes and image-receiving elements useful therein.

Diffusion transfer processes for forming transfer images, in silver or in dye(s), have received wide acceptance. Certain commercial embodiments employ a photosensitive element and an image-receiving element which are spaced apart during exposure and thereafter brought into superposed relationship. Development and transfer image formation are effected by distributing a viscous alkaline processing composition between these two elements as they are passed between a pair of pressure applying members to form a temporary laminate or "sandwich". The processing composition is initially contained in a rupturable container or "pod", said container being so mounted on one of said elements as to be positioned between said elements as they are passed between said pressure applying members, thereby rupturing the container and spreading the viscous processing composition between the superposed photosensitive and image-receiving elements. After an appropriate imbibition period, the image-receiving element is separated so that the transfer image may be viewed. If the photosensitive element and the image-receiving element include appropriate opaque layer(s), the temporary laminate may be removed from the camera and processing completed in the surrounding lighted area without further exposure of the photosensitive layer(s).

In my U.S. Pat. No. 3,415,644 issued Dec. 10, 1968, I have disclosed diffusion transfer film units wherein the image-receiving element is secured to the photosensitive element prior to photoexposure and distribution of a viscous processing composition. The support of the image-receiving element is transparent and photoexposure is effected through said transparent support. The viscous processing composition when solidified provides a light-reflecting layer, e.g., of titanium dioxide, to mask the developed photosensitive element from view and to provide a white background against which the transfer image may be viewed through the transparent support through which exposure was effected. The resulting laminate is a permanent laminate, and there are no waste components to be disposed of. The transfer image of the resulting integral negative-positive reflection print is geometrically reversed with respect to the photographed subject; for this reason exposure is effected using an image-reversing optical system. Cameras containing such image-reversing optical systems, and particularly single lens reflex embodiments thereof, are described in a number of issued patents and have been found to offer a number of advantages and/or conveniences.

U.S. Pat. No. 3,778,271 issued Dec. 11, 1973 discloses film units for obtaining similar integral negative-positive reflection prints wherein the photosensitive element and the image-receiving element are spaced apart during exposure, and a viscous processing fluid is distributed between the opposed elements as they are brought into superposed relationship. A light-reflecting layer is carried by the image-receiving element, which may also carry an opaque layer or an opaque layer may be provided by the processing fluid.

The present invention has as its principal object providing diffusion transfer films adapted for use in cameras employing image-reversing optical systems, the processed film comprising a permanent laminate of the photosensitive and image-receiving elements without the use of a viscous processing composition.

A further object of this invention is to provide a novel image-receiving element for use in diffusion transfer processes, said image-receiving element being impregnated with a nonviscous processing composition and including an opaque layer and a pigmented white light-reflecting layer carried on a transparent support, the transfer image being viewed through said transparent support against said white layer.

Another object of this invention is to provide novel diffusion transfer roll films wherein the curl sets imparted to the rolled up image-receiving element and to the rolled up photosensitive element are used to impart anticurl properties to a permanent laminate formed of said elements.

Other objects of the invention will in part be obvious and will in part appear hereinafter.

The invention accordingly comprises the process comprising the several steps and the relation and order of one or more of said steps with respect to each of the others, and the product possessing the features, properties and the relation of components which are exemplified in the following detailed disclosure, and the scope of the application of which will be indicated in the claims.

Figure 2:
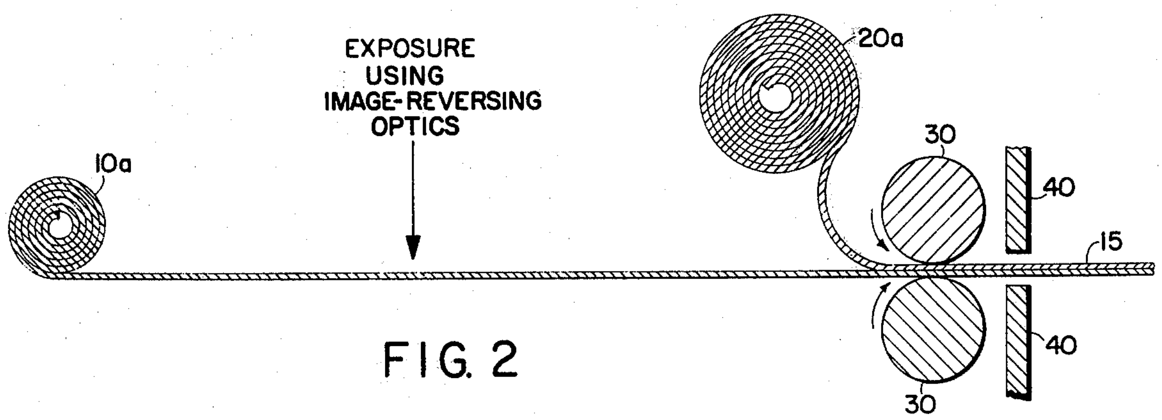

For a fuller understanding of the nature and objects of the invention, reference should be had to the following detailed description taken in connection with the accompanying drawing wherein:

FIG. 1 is a sectional diagrammatic view of a laminate, formed in accordance with this invention, of a photosensitive element and an image-receiving element and including a transfer image; and FIG. 2 is a schematic representation of a diffusion transfer film as positioned and utilized within a camera employing an image-reversing optical exposure system, including the formation of a permanent laminate such as that illustrated in FIG. 1.

As noted above, diffusion transfer processes are well known and are extensively described in the patent literature. For this reason detailed and lengthy descriptions of such processes are not necessary here. By way of illustration, however, reference may be made to U.S. Pat. No. 2,983,606 issued May 9, 1961 to Howard G. Rogers for a detailed description of a diffusion transfer process particularly preferred and adapted for employment in the present invention. That patent describes and claims the formation of color transfer images using dye developers, i.e., dyes which are also silver halide developing agents. In such processes, the dye developer is immobilized or precipitated in developed areas of the exposed silver halide layer as a function of development. This immobilization is apparently, at least in part, due to a change in the solubility characteristics of the dye developer upon oxidation, especially as regards the solubility and diffusibility in alkaline solution of the oxidation product. Unoxidized dye developer present in undeveloped and partially developed areas of the exposed silver halide layer remains unoxidized and diffusible, thereby providing an imagewise distribution of dissolved and diffusible dye developer, as a function of the point-to-point degree of exposure of the silver halide layer. At least part of this imagewise distribution of diffusible dye developer is transferred, by diffusion, to an image-receiving layer in superposed relationship with the developed silver halide layer to provide the desired color transfer image. Since the use of dye developers constitutes a preferred embodiment of this invention, the further description of this invention will employ dye developers for illustrative purposes. As will be pointed out later, other image former materials and other image-forming systems also may be used in accordance with the inventive concepts herein disclosed.

Further description of this invention may be facilitated by reference to FIGS. 1 and 2 taken together. In FIG. 1 there is illustrated a permanent laminate 15 of a photosensitive element 10 and an image-receiving element 20. The photosensitive element 10 comprises, in sequence, a transparent support 12, an opaque layer 14, a polymeric acid layer 16, an interlayer or timing layer 17, a layer 18 of a dye developer and a silver halide layer 22. In a particularly useful embodiment, illustrated in part in FIG. 2, the photosensitive element 10 is positioned in a camera (not shown) as a tightly wound coil or roll **10*a* having the support 12 as the outer surface of the coil. The photosensitive element 10 is unwound from the roll 10*a* thereof and into an exposure plane, the photosensitive silver halide layer 22 facing the light passing through the camera optical system. The image-receiving element 20 comprises, in sequence, a transparent support 12*a*, an image-receiving layer 28, a white pigmented layer 26 and an opaque layer 14*a*; a nonviscous processing composition or liquid is impregnated in one or more permeable layers carried by the transparent support 12*a*. The image-receiving element 20 is positioned in the camera as a tightly wound coil or roll 20*a* and so positioned in the camera that it may be unwound with the outermost liquid-impregnated layer (14*a*) in position to be pressed into face-to-face contact with the photosensitive layer 22 of the photosensitive element 10 as said elements are advanced between pressure applying members 30. The resulting permanent laminate 15 may be removed from the camera through suitable exit members 40 even though the silver halide layer 22 is still photosensitive since the above-recited opaque layers 14 and 14*a* are effective to prevent further (nonimagewise) exposure. The processing liquid impregnated into the image-receiving element 20 is absorbed by the liquid permeable layers of the photosensitive element 10 and dissolves the dye developer coated behind the silver halide layer. As a result of the development of the exposed silver halide layer 22, an imagewise distribution of unoxidized dye developer is transferred to the image-receiving layer 28 by diffusion through the permeable opaque layer 14*a* and the permeable white pigmented layer 26. The resulting dye image is viewable through the transparent support 12*a* against the white pigmented layer 26. The transparent supports 12 and 12*a*** provide physical protection to the transfer image within the resulting permanent laminate and facilitate safe handling thereof.

Photosensitive and image-receiving elements provided as tightly wound rolls or coils when unwound demonstrate a strong tendency, sometimes referred to as a "memory" effect, to resume their previous curled condition. This "curl set" is particularly pronounced when the support is a polymeric film base such as cellulose triacetate, polyethylene terephthalate and similar materials. The transparent support **12*a* for the image-receiving element is such a polymeric film base, and the support 12 for the photosensitive element preferably is also. It is a feature of this invention that the respective photosensitive and image-receiving elements are so coiled that upon unwinding to provide face-to-face contact the curl set exhibited by each element exerts a tendency to curl towards the other element now laminated to it. The respective curl tendencies effectively cancel each other out and provide flatness and anticurl characteristics to the resulting permanent laminate 15**.

In accordance with the present invention, the aqueous alkaline liquid required for processing is carried by the image-receiving element itself. This makes possible a very simple film assemblage essentially comprising two sheets, as compared with film assemblages including such components as masks, containers, liquid-trapping devices, indexing members and the like, requiring careful and precise fabrication and assembly to insure proper operation, registration and location of the various components during processing. The processing components of the camera for use in practicing this invention are correspondingly simplified since they are not required to dispense and/or distribute a viscous processing liquid in a precise manner and trap excess processing liquid, but are required only to press the two sheets into face-to-face contact since the liquid is already distributed in the required amount in the image-receiving element.

The liquid carried by the image-receiving element is highly alkaline, this alkalinity preferably being achieved by the inclusion in the liquid of an alkali metal hydroxide, such as sodium hydroxide or potassium hydroxide. The alkali is preferably present in sufficient quantity to achieve a pH of at least 12. In order to maintain the liquid in the image-receiving element in this highly alkaline condition for appreciable periods prior to use, suitable precautions must be taken to prevent excessive pH reduction during storage, e.g., from absorption of carbon dioxide by the processing liquid. One technique for excluding carbon dioxide, such as is found in the atmosphere, from the liquid is to include within the camera a container and/or a container closure for protecting the liquid-carrying, image-receiving sheet from the atmosphere while allowing successive areas of the image-receiving element to be withdrawn from a container (gas impermeable) in the camera and pressed into superposition with successive exposed areas of the photosensitive element. The container and container closure may comprise components of the camera or cooperating components of both the camera and film assemblage employed therein, while achieving the object of providing a simple and less expensive film assemblage capable of being processed in a less complicated camera.

The image-receiving element or sheet comprises a transparent support **12*a*, preferably of a material which is chemically inert to, is insoluble in and impermeable to aqueous alkaline liquids, and an image-receiving layer 28 for receiving the transferred image-forming materials. Where the transfer image is composed of one or more dyes, the image-receiving layer preferably includes a mordant for said dye(s). A light-reflecting layer 28, preferably white to provide white highlights in the final reflection print, is composed of a suitable pigment such as titanium dioxide or barium sulfate in a suitable binder, e.g., polyvinyl alcohol. An opaque layer 14***a* provided over the light-reflecting layer 26 comprises a light-absorbing pigment, e.g., carbon black, in a suitable binder, e.g., polyvinyl alcohol. Alternatively, light-absorbing properties may be provided in the opaque layer 14*a* by one or more non-diffusing, alkali-stable dyes having appropriate absorption properties. The opaque layer 14*a* should have an opacity, in combination with the light-reflecting layer 26, sufficient to protect the developing silver halide emulsion(s) from further exposure (fogging exposure) when the laminate 15 is brought from the dark into ambient light. A transmission density of these two layers together of about 6.0 or more is generally sufficient to prevent post-exposure fog by ambient light incident on the transparent support 12*a* through which the transfer image in the image-receiving layer 28 is viewed.

In lieu of a separate opaque layer 14, support 12 may be pigmented to the requisite opacity.

It will be understood that the opacity required, particularly of the opaque layer 14*a* in the image-receiving element 20, is a function of the ambient light intensity of the lighted area, the sensitivity or "speed" of the film, and the time during which development should proceed in the "dark". Accordingly, the opacity necessary for any particular film and diffusion transfer process may be readily determined by routine testing.

The image-receiving element may have the processing liquid distributed substantially uniformly through the permeable layers, including the image-receiving layer, i.e., the layers containing the processing liquid may have substantially the same permeability to said liquid. Alternatively, the layers of the image-receiving element may vary in their permeability to the processing liquid. Image-receiving elements of the latter type are described in my U.S. Pat. No. 3,345,165 issued Oct. 3, 1967; as disclosed therein, the layers of the image-receiving element vary in a progressive or graded manner in their permeability to a processing liquid imbibed or impregnated therein, so that the amount of processing liquid is less in layers close to the support and greatest in the layers farthest from the support. Details of such image-receiving elements in which the layers thereof vary in their hydrophilic character to provide graded permeability and hence graded liquid content when impregnated with an alkaline processing liquid may be found in said U.S. Pat. No. 3,345,165 and therefore need not be repeated here.

Other techniques for providing elements adapted to be impregnated with an aqueous alkaline processing liquid also are described in the literature, e.g., in U.S. Pat. No. 3,179,517 issued Apr. 20, 1965 to Tregillus et al. and in other patents concerned with web processing.

The various layers of the image-receiving element are composed of materials, preferably polymeric, which are chemically stable to the aqueous alkaline processing solution. Thus, the use of gelatin generally is not desirable unless the liquid impregnated image-receiving element will be used within a short time, since gelatin will hydrolyze if left in contact with strong alkali over a period of time. On the other hand, partially hydrolyzed polyvinyl acetate may be employed in certain locations since the fully hydrolyzed product, i.e., polyvinyl alcohol, has the requisite alkali stability.

As examples of materials suitable for use as the water-impermeable and alkali-impermeable transparent support, mention may be made of polyethylene terephthalate, polyvinyl butyral and polyethylene. Other useful materials will readily suggest themselves to one skilled in the art.

A particularly useful image-receiving layer comprises a mixture of polyvinyl alcohol and poly-4-vinylpyridine. With such an image-receiving layer, particularly useful graded permeability layers for disposition intermediate the image-receiving layer and the support comprise mixtures of poly-4-vinylpyridine and polyvinyl alcohol, the proportion of polyvinyl alcohol increasing progressively outward from the support.

Suitable apparatus for use with the above-described diffusion transfer film is described, for example, in my U.S. Pat. No. 3,254,583 issued June 7, 1966, to which reference should be made. The camera will, of course, contain image-reversing optics to insure obtaining a right-reading transfer image.

The photosensitive element is supplied in a coiled condition in the usual manner, e.g., on a spool. The liquid impregnated image-receiving sheet is supplied in a coiled condition in a container which is substantially impermeable to the processing liquid, water vapor and gases, particularly carbon dioxide (and oxygen where a silver halide developing agent is present in the processing liquid). Suitable containers for liquid impregnated image-receiving sheets are known in the art, as are suitable sealing means therefor.

The image-receiving element 20 is coiled with the liquid impregnated surface layer facing inwardly. Since the container must be opened to permit the withdrawal of the image-receiving sheet and thus possibly permit escape of water vapor and/or admission of air, it may be desirable to provide a reservoir of excess processing liquid within the container together with means for getting carbon dioxide so that any carbon dioxide gaining admission to the container does not react with the hydroxide in the processing liquid to reduce the pH thereof. The image-receiving sheet is preferably coiled tightly upon itself to help prevent contact between the liquid impregnated layers and the atmosphere of the container. In order to prevent loss (by evaporation) of processing liquid from the image-receiving element, the atmosphere of the container is preferably maintained saturated with water vapor by the provision of a reservoir of water or processing liquid. This reservoir of excess processing liquid or water may comprise the image-receiving layer itself which may be impregnated with excess liquid which could be removed by squeegeeing during withdrawal of the receiving sheet from the container so that the sheet, upon withdrawal from the container, is substantially dry to the touch with all the liquid required for processing being retained within it. Other techniques for achieving this result will be apparent to those skilled in the art.

In order to maintain the high pH level of the liquid carried by the image-receiving sheet, it may be necessary to provide a getter for any carbon dioxide which enters the container. Alkaline earth metal hydroxides particularly are suggested for use as getters and include hydroxides which combine with carbon dioxide to form carbonates which are less soluble than the carbonates formed by the alkali metal hydroxide in the processing liquid. For example, when potassium hydroxide is used in the processing liquid, calcium hydroxide may be provided for reacting with carbon dioxide in order to prevent reaction of the potassium hydroxide with carbon dioxide within the container. Barium hydroxide is also suggested as a getter when potassium hydroxide is employed in the processing liquid. Sodium hydroxide may be incorporated in the processing liquid instead of potassium hydroxide to provide for the high pH thereof, in which case any of potassium hydroxide, barium hydroxide and calcium hydroxide may be incorporated in the container as a getter for carbon dioxide.

To process an exposed area of the photosensitive element to produce a transfer image in a corresponding area of the image-receiving sheet, the two sheets are pressed into superposition with one another. This processing is accomplished by a pair of pressure rolls 30. Such rolls may comprise a metal shaft covered by an elastomeric material such that the rolls are slightly compressible and, in fact, the resiliency of the elastomeric material may be employed to apply the necessary pressure to the two sheets.

In practice, the image-receiving element 20 extends from its container (not shown) into superposition with the photosensitive element 10 between the rolls 30. The rolls are rotated in engagement with the superposed sheets in order to superpose an exposed area of the photosensitive element with an area of the image-receiving sheet and simultaneously advance the sandwich thus formed from the camera through slot 40 and advance the next succeeding area of the photosensitive element sheet into position for exposure. Suitable gear means (not shown) may be provided the rolls, preferably with a gear ratio such that one complete revolution of a crank rotates roll 30 sufficiently to advance an exposed area of the photo-sensitive element into superposition with the image-receiving element and from the camera. It should be noted that the rolls 30 are located as close as possible to the end edge of the exposed area so as to minimize the length of sheet materials constituting waste between successive exposed areas of the photosensitive sheet and the length of the image-receiving sheet superposed therewith.

As noted above, the film preferably is advanced by driven rolls, and such rolls may be driven manually or by a suitable motor. While manual advance of the film is possible, such an embodiment is less preferred. It will be understood that suitable perforations, including sprocket holes, may be provided along one or both edges for indexing and/or film advancement purposes.

The film unit illustrated in FIG. 1 has, for convenience, been shown as a monochrome film. Multicolor images may be obtained by providing the requisite number of differentially exposable silver halide emulsions, and said silver halide emulsions are most commonly provided as individual layers coated in superposed relationship. Film units intended to provide multicolor images comprise two or more selectively sensitized silver halide layers each having associated therewith an appropriate image dye-providing material providing an image dye having spectral absorption characteristics substantially complementary to the light by which the associated silver halide is exposed. The most commonly employed negative components for forming multicolor images are of the "tripack" structure and contain blue-, green-, and red-sensitive silver halide layers each having associated therewith in the same or in a contiguous layer a yellow, a magenta and a cyan image dye-providing material respectively. Interlayers or spacer layers may, if desired, be provided between the respective silver halide layers and associated image dye-providing materials or between other layers. Integral multicolor photosensitive elements of this general type are disclosed in U.S. Pat. No. 3,345,163 issued Oct. 3, 1967 to Edwin H. Land and Howard G. Rogers as well as in the previously noted U.S. patents, e.g., in FIG. 9 of the aforementioned U.S. Pat. No. 2,983,606.

A number of modifications to the structures described in connection with the figures will readily suggest themselves to one skilled in the art. Thus, for example, the multicolor multilayer negative may be replaced by a screen-type negative as illustrated in U.S. Pat. No. 2,968,554 issued Jan. 17, 1961 to Edwin H. Land and in the aforementioned U.S. Pat. No. 2,983,606 particularly with respect to FIG. 3 thereof.

The image dye-providing materials which may be employed in such processes generally may be characterized as either (1) initially soluble or diffusible in the processing composition but are selectively rendered non-diffusible in an imagewise pattern as a function of development; or (2) initially insoluble or non-diffusible in the processing composition but which are selectively rendered diffusible or provide a diffusible product in an imagewise pattern as a function of development. These materials may be complete dyes or dye intermediates, e.g., color couplers. The requisite differential in mobility or solubility may, for example, be obtained by a chemical action such as a redox reaction or a coupling reaction.

As examples of initially soluble or diffusible materials and their application in color diffusion transfer, mention may be made of those disclosed, for example, in U.S. Pat. Nos. 2,774,668; 2,968,554; 2,983,606, 3,087,817; 3,185,567; 3,230,082; 3,345,163; and 3,443,943. As examples of initially non-diffusible materials and their use in color transfer systems, mention may be made of the materials and systems disclosed in U.S. Pat. Nos. 3,185,567; 3,443,939; 3,443,940; 3,227,550; and 3,227,552. Both types of image dye-providing substances and film units useful therewith also are discussed in U.S. Pat. No. 3,647,437 issued Mar. 7, 1972 to Edwin H. Land, to which reference may be made.

It will be understood that dye transfer images which are neutral or black-and-white instead of monochrome or multicolor may be obtained by use of a single dye or a mixture of dyes of the appropriate colors in proper proportions, the transfer of which may be controlled by a single layer of silver halide, in accordance with known techniques. It is also to be understood that "direct positive" silver halide emulsions may also be used, depending upon the particular image dye-providing substances employed and whether a positive or negative color transfer image is desired.

It will also be understood that the present invention may be utilized with films wherein the final image is in silver.

The dye developers (or other image dye-providing substances) are preferably selected for their ability to provide colors that are useful in carrying out subtractive color photography, that is, the previously mentioned cyan, magenta and yellow. They may be incorporated in the respective silver halide emulsion or, in the preferred embodiment, in a separate layer behind the respective silver halide emulsion. Thus a dye developer may, for example, be in a coating or layer behind the respective silver halide emulsion and such a layer of dye developer may be applied by use of a coating solution containing the respective dye developer distributed, in a concentration calculated to give the desired coverage of dye developer per unit area, in a film-forming natural, or synthetic, polymer, for example, gelatin, polyvinyl alcohol, and the like, adapted to be permeated by the processing composition.

Dye developers, as noted above, are compounds which contain the chromophoric system of a dye and also a silver halide developing function. By "a silver halide developing function" is meant a grouping adapted to develop exposed silver halide. A preferred silver halide development function is a hydroquinonyl group. Other suitable developing functions include ortho-dihydroxyphenyl and ortho- and para-amino substituted hydroxyphenyl groups. In general, the development function includes a benzenoid developing function, that is, an aromatic developing group which forms quinonoid or quinone substances when oxidized.

Since the various diffusion transfer systems which have been described employ an aqueous alkaline processing fluid, it is desirable to employ an acid-reacting reagent in a layer of the film unit to lower the environmental pH following substantial transfer of the image-forming components. This pH reduction is effective to increase image stability and/or to adjust the pH from the first pH at which the image-forming components, e.g., dyes, are diffusible to a second (lower) pH at which they are not. This pH reduction may be effected by an acid-reacting reagent positioned in a layer of the photosensitive element. As illustrated in FIG. 1, such an acid-reacting reagent layer may be a polymeric acid layer 16 positioned adjacent the support 12 behind the dye developer layer 18. These polymeric acids may be polymers which contain acid groups, e.g., carboxylic acid and sulfonic acid groups, which are capable of forming salts with alkali metals or with organic bases; or potentially acid-yielding groups such as anhydrides or lactones. Preferably the acid polymer contains free carboxyl groups.

An inert interlayer or spacer layer 17 may be and is preferably disposed between the polymeric acid layer 16 and the dye developer layer 18 in order to control or "time" the pH reduction so that it is not premature, i.e., so that it does not occur so early during processing as to interfere with the development process. Suitable spacer or "timing" layers for this purpose are described with particularity in U.S. Pat. Nos. 3,362,819; 3,419,389; 3,421,893; 3,455,686; and 3,575,701.

A particularly useful polymeric acid for use in the polymeric acid layer 16 is a partial butyl ester of poly-(ethylene/maleic anhydride). This and other polymeric acid-reacting materials are described in detail in my U.S. Pat. No. 3,362,821 issued Jan. 9, 1968 and in my U.S. Pat. No. 3,573,043 issued Mar. 30, 1971, to which reference should be made for more details. Each of these patents describe diffusion transfer film units wherein the photosensitive element includes an acid-reacting reagent. Another system for providing an acid-reacting reagent is described in my U.S. Pat. No. 3,576,625 issued Apr. 27, 1971.

The processing liquid impregnated into the image-receiving element generally will be substantially the same in composition as processing compositions utilized in processing corresponding diffusion transfer processes utilizing viscous processing fluids and illustrated extensively in issued patents, except that the viscosity-providing component (generally a polymer) and any insolubles (e.g., titanium dioxide or carbon black) are omitted. In certain instances, as where the viscosity-providing component is a polymer containing acidic groups, such as carboxymethyl cellulose, the alkali content may be reduced since alkali will not be consumed in neutralizing acidic functions or otherwise rendering the omitted component soluble in or compatible with the processing fluid.

Although this invention has been illustrated in connection with camera applications, it will be understood that the liquid-impregnated image-receiving elements of this invention also are very useful in continuous processing applications, such as photofinishing processing of color print copies. In such continuous processes, it is desirable to position suitable cutting means, such as a pair of knives, to sever the individual frames. Where desired, e.g., for aesthetic reasons or to insure that the superposed elements remain a permanent laminate, a suitable frame or mask may be affixed to the individual prints. Such a mask may be similar to that shown in FIG. 5 of U.S. Pat. No. 3,732,101 issued May 8, 1973 to Edwin H. Land and Albert J. Bachelder, and should have an aperture corresponding to the image area of the print, thus providing a suitable border for the print image. Folding the edges of the mask over the edges of the print and securing the folded portions of the mask to the back of the print is effective to prevent delamination of the print at the edges during handling. Where the film includes edge perforations or sprocket holes for film indexing or advancement, the mask will be effective to cover these holes. The mask may be readily affixed to the print by a pressure sensitive adhesive.

Use of the liquid-impregnated image-receiving elements of this invention provides a number of advantages. One important advantage which may be mentioned is the elimination of excess processing composition. In addition, the manner of supplying the liquid processing composition and the distribution thereof may be more uniform than if a conventional rupturable container were used. Because of the intimate contact between the two sheets and the absence of a layer of viscous reagent therebetween, lateral diffusion of transferring dyes is minimized.

It is recognized that U.S. application Ser. No. 40,438 filed May 25, 1970 by Harold E. Cole and published on Dec. 1, 1970 as Defensive Publication T-881,010 proposes to use an opaque processing web containing a processing fluid to form a diffusion transfer image. The present invention may be readily distinguished therefrom, e.g., by the use of an image-receiving element as the carrier impregnated with the processing liquid, i.e., the image-receiving layer is positioned in the element carrying the processing liquid. In addition, the processing liquid impregnated element includes a light-reflecting layer to mask the developed silver halide emulsion(s) and to provide a white background against which the transfer image may be viewed.

The transparent support may include a pigment to control light-piping by internal reflection; suitable transparent supports are disclosed in my copending U.S. application, Ser. No. 194,407 filed Nov. 1, 1971.

Where in the specification, the expression "positive image" has been used, this expression should not be interpreted in a restrictive sense since it is used primarily for purposes of illustration, in that it defines the image produced on the image-carrying layer as being reversed, in the positive-negative sense, with respect to the image in a negative-working photosensitive emulsion layer. As an example of an alternative meaning for "positive image", assume that the photosensitive element is exposed to actinic light through a negative transparency. In this case, the latent image in the photosensitive emulsion layers will be a positive and the dye image produced on the image-carrying layer will be a negative. The expression "positive image" is intended to cover such an image produced on the image-carrying layer, as well as an image produced by use of a direct positive emulsion, i.e., an image which is positive with respect to the photographed subject.

Since certain changes may be made in the above product and process without departing from the scope of the invention herein involved, it is intended that all matter contained in the above description or shown in the accompanying drawings shall be interpreted as illustrative and not in a limiting sense.

What is claimed is:

1. A diffusion transfer process comprising the steps of exposing a photosensitive silver halide element comprising a support carrying at least one photosensitive silver halide layer, each said silver halide layer having associated therewith an image dye-providing material, bringing said exposed photosensitive element into contact in the dark with the liquid-impregnated outer layer of a processing liquid-impregnated image-receiving element comprising an alkali-impermeable transparent support carrying, in sequence, an image-receiving layer, a light-reflecting layer and an opaque layer, said contact being effected under pressure sufficient to obtain surface-to-surface wet contact to form a laminate, with said supports outermost, whereby a quantity of said liquid sufficient to process said exposed photosensitive element is absorbed by said exposed photosensitive element from said liquid-impregnated image-receiving element thereby (a) developing said exposed photosensitive element, (b) forming an imagewise distribution of a diffusible image dye-providing material as a function of said development, and (c) transferring at least a portion of said imagewise distribution of said diffusible image dye-providing material through said opaque layer and said pigmented white layer to said image-receiving layer to form a transfer dye image viewable through said transparent support against said white pigmented layer without separating said superposed elements, and advancing said laminate from said dark area to a lighted area prior to completion of said transfer dye image, an opaque layer in said photosensitive element and said opaque layer in said image-receiving element being effective to prevent further exposure of said photosensitive silver halide.

2. A diffusion transfer process as defined in claim 1 wherein said transfer image is a multicolor image.

3. A diffusion transfer process as defined in claim 1 wherein said diffusible image dye-providing material is a dye.

4. A diffusion transfer process as defined in claim 3 wherein said dye is a dye developer.

5. A diffusion transfer process as defined in claim 1 wherein said photosensitive element is coiled in a roll with the support therefor positioned outwardly and said liquid-impregnated image-receiving element is coiled in a roll with the transparent support therefor positioned outwardly, whereby opposite curl sets are imparted to said elements and said laminate of said elements will resist curling.

6. A diffusion transfer process as defined in claim 1 wherein at least one of said elements includes edge perforations, and a mask is secured to said laminate to cover said edge perforations and frame the image in said laminate.

7. A diffusion transfer process as defined in claim 1 wherein said photosensitive element includes an acid-reacting reagent separated from the silver halide emulsion(s) by a spacer layer which controls the availability of said acid-reacting reagent to reduce the pH of the processing liquid.

8. A diffusion transfer process as defined in claim 1 wherein said image-receiving layer includes a dye mordant.

9. A continuous diffusion transfer process comprising the steps of photoexposing, using an image-reversing optical system, sequential frames of a length of multicolor photosensitive element, said photosensitive element including a red-sensitive silver halide emulsion, a green-sensitive silver halide emulsion, and a blue-sensitive silver halide emulsion, each of said silver halide emulsions having associated therewith, respectively, cyan, magenta and yellow image dye-providing materials; advancing each said exposed frame into contact with the liquid-impregnated outer layer of a liquid-impregnated image-receiving element comprising an alkali-impermeable transparent support carrying, in sequence, and image-receiving layer, a white pigmented light-reflecting layer, and an opaque layer, said contact being effected in the dark and under pressure sufficient to obtain surface-to-surface wet contact to form a laminate of said exposed frame with a corresponding area of said image-receiving element with said supports outermost whereby a quantity of said liquid sufficient to process said exposed photosensitive element is absorbed by said exposed photosensitive element, thereby (a) developing said exposed photosensitive element, (b) forming imagewise distributions of diffusible cyan, magenta and yellow image dye-providing materials as a function of the development of said silver halide emulsions, and (c) transferring at least a portion of each of said imagewise distributions of diffusible image dye-providing materials through said opaque layer and said white pigmented layer to said image-receiving layer to form a multicolor transfer image viewable through said transparent support against said white pigmented layer without separating said superposed elements, advancing said laminate from said dark area to a lighted area prior to completion of said transfer dye image, an opaque layer in said photosensitive element and said opaque layer in said image-receiving element being effective to prevent further exposure of said silver halide emulsions; severing said length of photosensitive element between exposed frames thereof to provide a plurality of individual laminates each containing a multicolor transfer image; securing a mask to each said individual laminate, each said mask including an aperture substantially corresponding to the transfer image area and edge portions which are folded around the edges of said individual laminate.

* * * * *